(12) United States Patent
Watanabe

(10) Patent No.: US 8,731,571 B2
(45) Date of Patent: May 20, 2014

(54) RADIO BASE STATION DEVICE AND RADIO RESOURCE CONNECTION SWITCHING METHOD

(75) Inventor: Hiroaki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 12/626,832

(22) Filed: Nov. 27, 2009

(65) Prior Publication Data

US 2010/0075688 A1    Mar. 25, 2010

Related U.S. Application Data

(63) Continuation of application No. PCT/JP2007/000602, filed on Jun. 4, 2007.

(51) Int. Cl.
*H04W 72/00* (2009.01)

(52) U.S. Cl.
USPC ............ 455/450; 370/229; 370/329; 370/343

(58) Field of Classification Search
USPC ........................... 455/450; 370/229, 329, 343
See application file for complete search history.

(56) References Cited

U.S. PATENT DOCUMENTS

| | | | | |
|---|---|---|---|---|
| 6,122,260 | A * | 9/2000 | Liu et al. ...................... | 370/280 |
| 6,201,972 | B1 | 3/2001 | Hamabe ........................ | 455/450 |
| 6,223,041 | B1 * | 4/2001 | Egner et al. ................. | 455/452.2 |
| 6,574,476 | B1 | 6/2003 | Williams | |
| 7,715,846 | B2 * | 5/2010 | Ji et al. ......................... | 455/447 |
| 8,036,672 | B2 * | 10/2011 | Laroia et al. ................. | 455/450 |
| 2003/0069042 | A1 | 4/2003 | Sato et al. | |
| 2004/0106431 | A1 * | 6/2004 | Laroia et al. ................ | 455/552.1 |
| 2005/0288032 | A1 | 12/2005 | Orellana et al. | |
| 2008/0064361 | A1 * | 3/2008 | Bjork et al. .................. | 455/403 |
| 2008/0123600 | A1 * | 5/2008 | Fodor ........................... | 370/335 |
| 2008/0287130 | A1 * | 11/2008 | Laroia et al. ................. | 455/436 |
| 2009/0147748 | A1 | 6/2009 | Ofuji et al. | |

FOREIGN PATENT DOCUMENTS

| | | |
|---|---|---|
| GB | 2408657 A | 6/2005 |
| JP | A-H11-275625 | 10/1999 |
| JP | A-2000-115828 | 4/2000 |
| JP | 2003-9217 | 1/2003 |
| JP | A-2004-343309 | 12/2004 |
| JP | A-2005-27189 | 1/2005 |

(Continued)

OTHER PUBLICATIONS

International Search Report for PCT Application No. PCT/WO2008/149403 A1 dated Dec. 11, 2008.

(Continued)

*Primary Examiner* — George Eng
*Assistant Examiner* — Joseph Dean, Jr.
(74) *Attorney, Agent, or Firm* — Smith, Gambrell & Russell, LLP

(57) ABSTRACT

For example, in a radio communication system using an OFDMA method, frequency bandwidth allocated to each sector is modified according to, for example, the number of terminals existing in each sector, and the effective utilization of radio sources is promoted. A radio base station device includes unit to determine the amount allocated to each sector from the amount of radio resources in the base station and unit to switch over the connection states of a plurality of radio resources obtained by dividing the entire radio resources that can be allocated to each sector in the base station according to the determined amount of allocation.

4 Claims, 16 Drawing Sheets

(56) References Cited

FOREIGN PATENT DOCUMENTS

| JP | A-2006-311465 | 11/2006 |
| JP | A-2007-501567 | 1/2007 |
| JP | A-2007-510369 | 4/2007 |
| JP | A-2007-267267 | 10/2007 |
| WO | WO 2005/020606 A1 | 3/2005 |
| WO | WO 2006/109492 A1 | 10/2006 |

OTHER PUBLICATIONS

Notice of Rejection Grounds dated Nov. 29, 2011, received in Japanese Patent Application No. 2009-517623.

Extended European Search Report dated Nov. 26, 2012, issued in corresponding European Patent Application No. 07737258.9-1249/2157811.

* cited by examiner

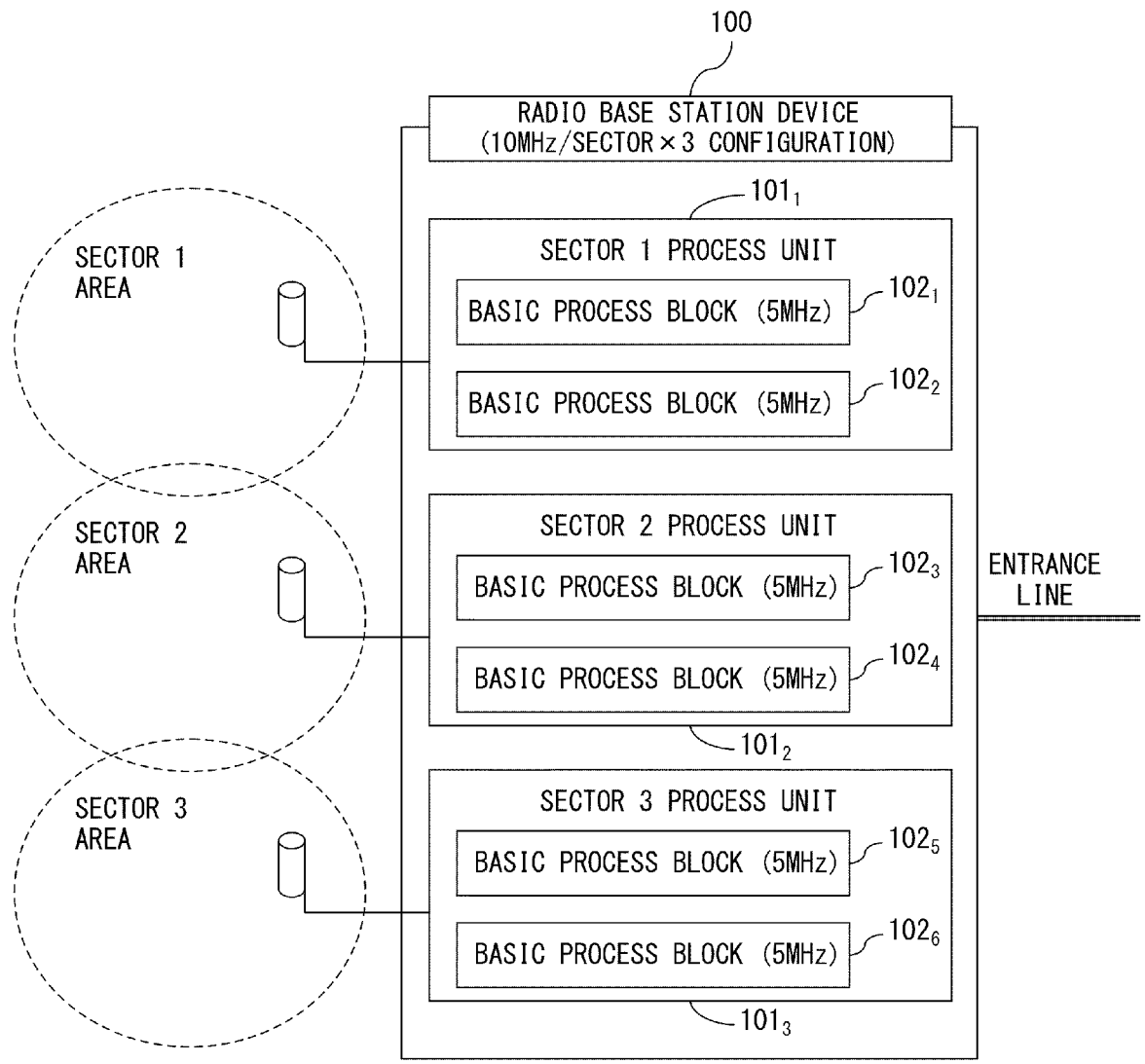
F I G. 1

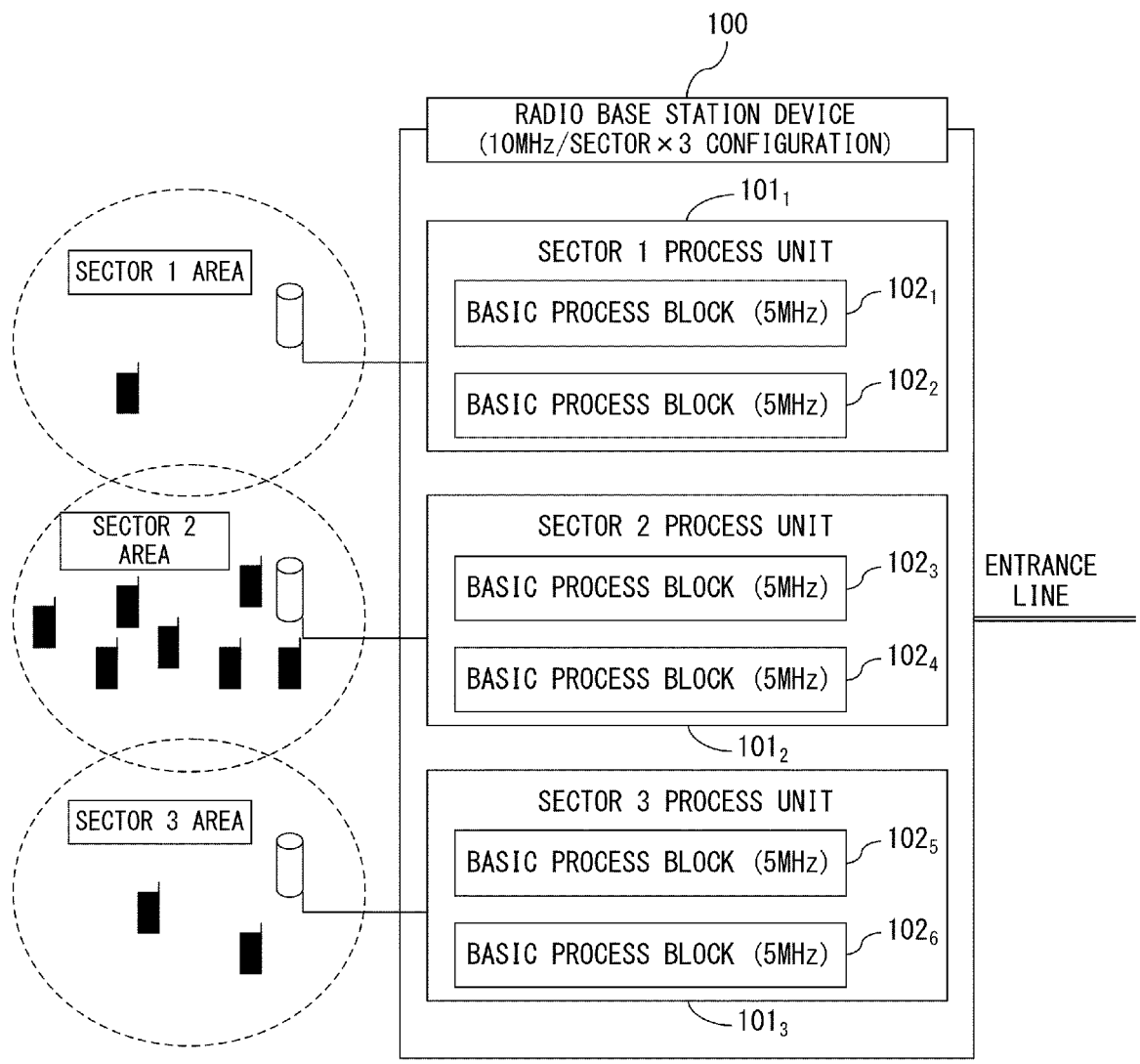
F I G. 2

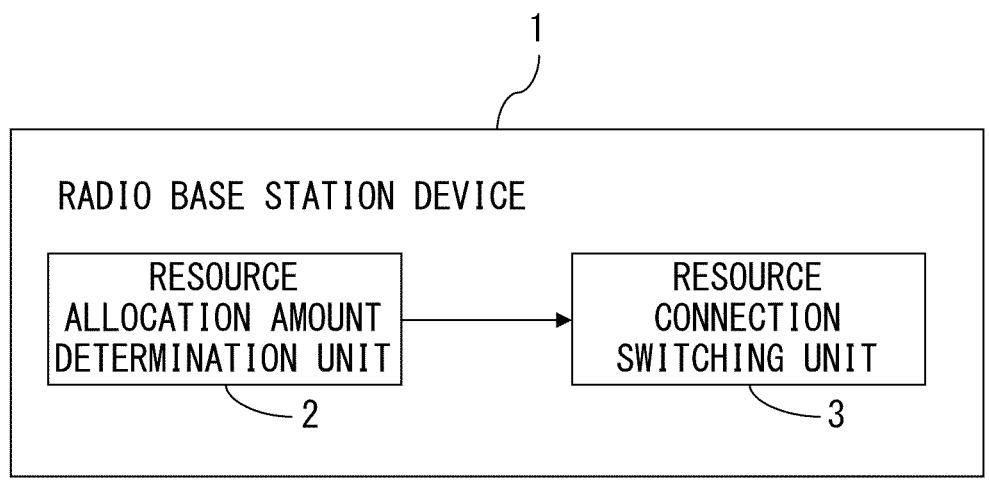
F I G. 3

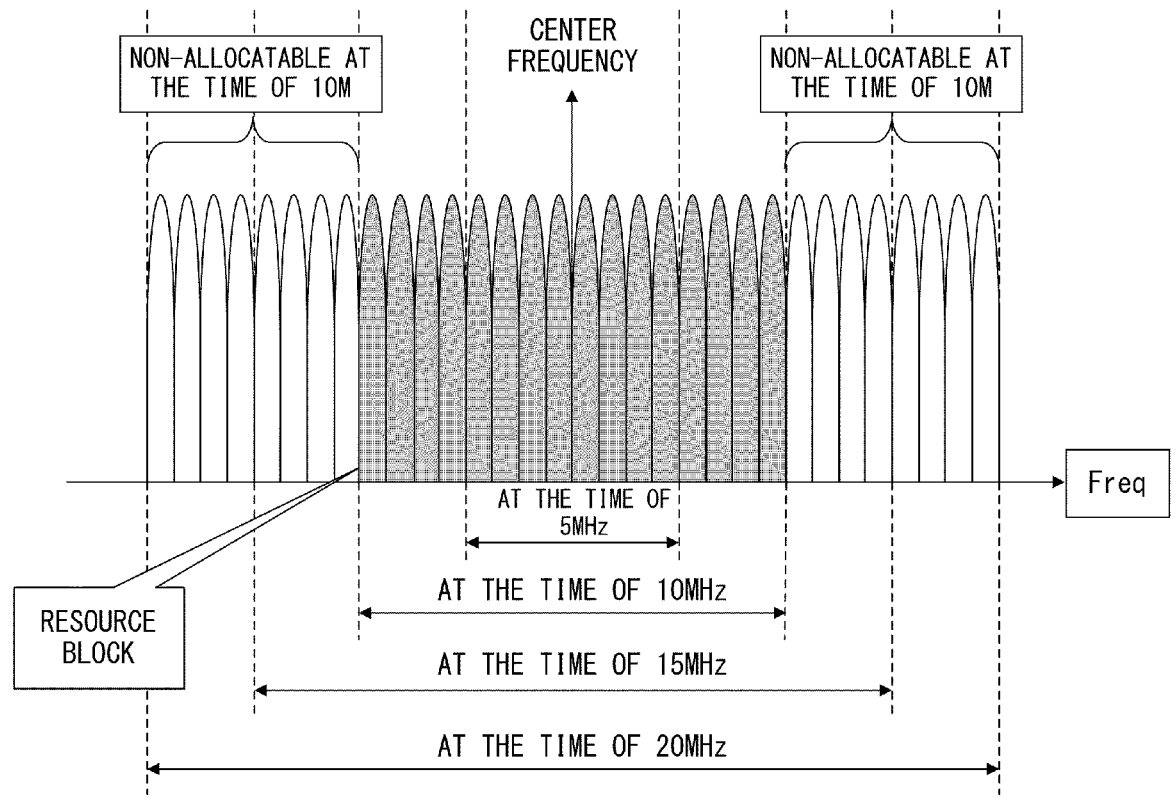
F I G. 5

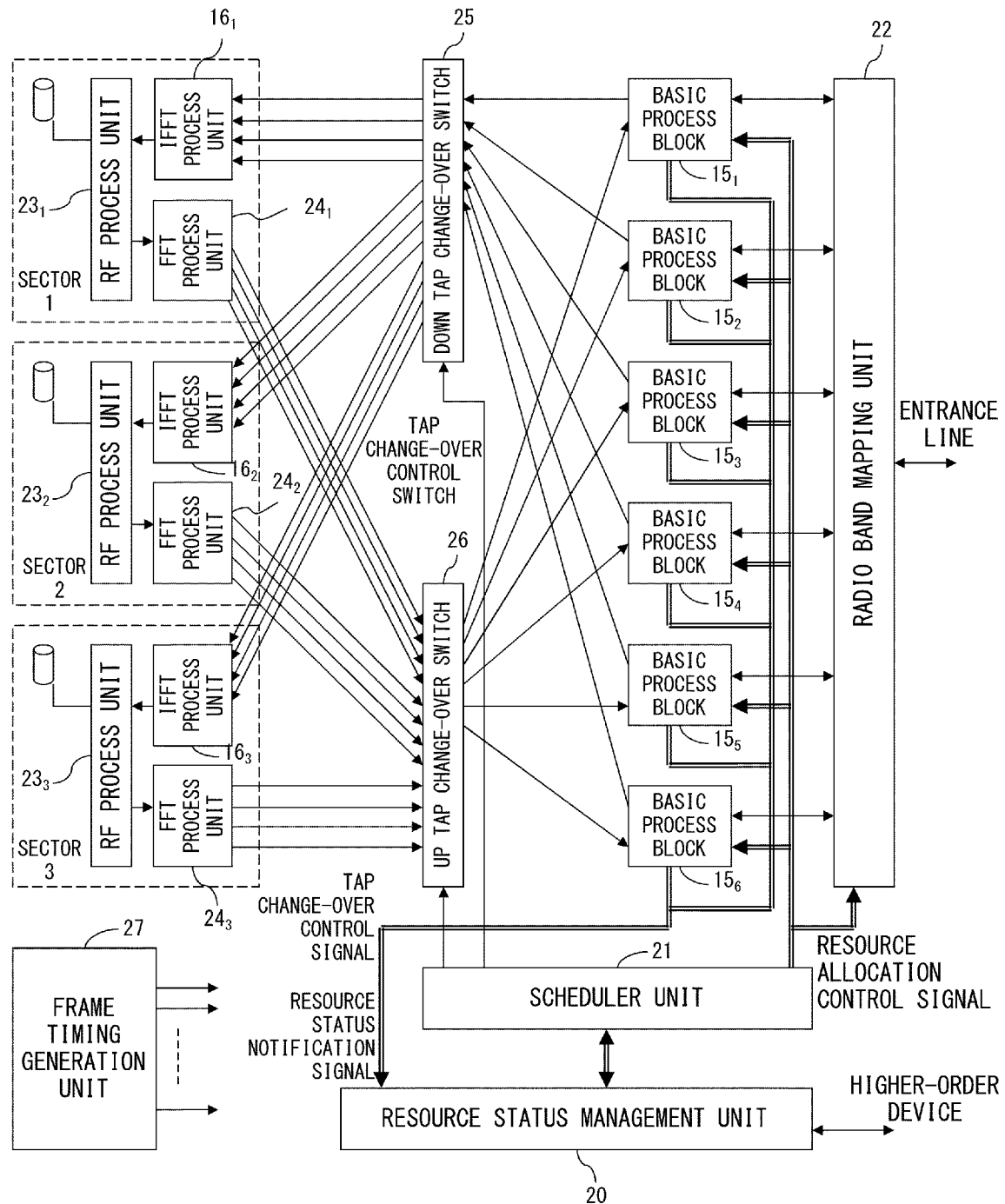
F I G. 8

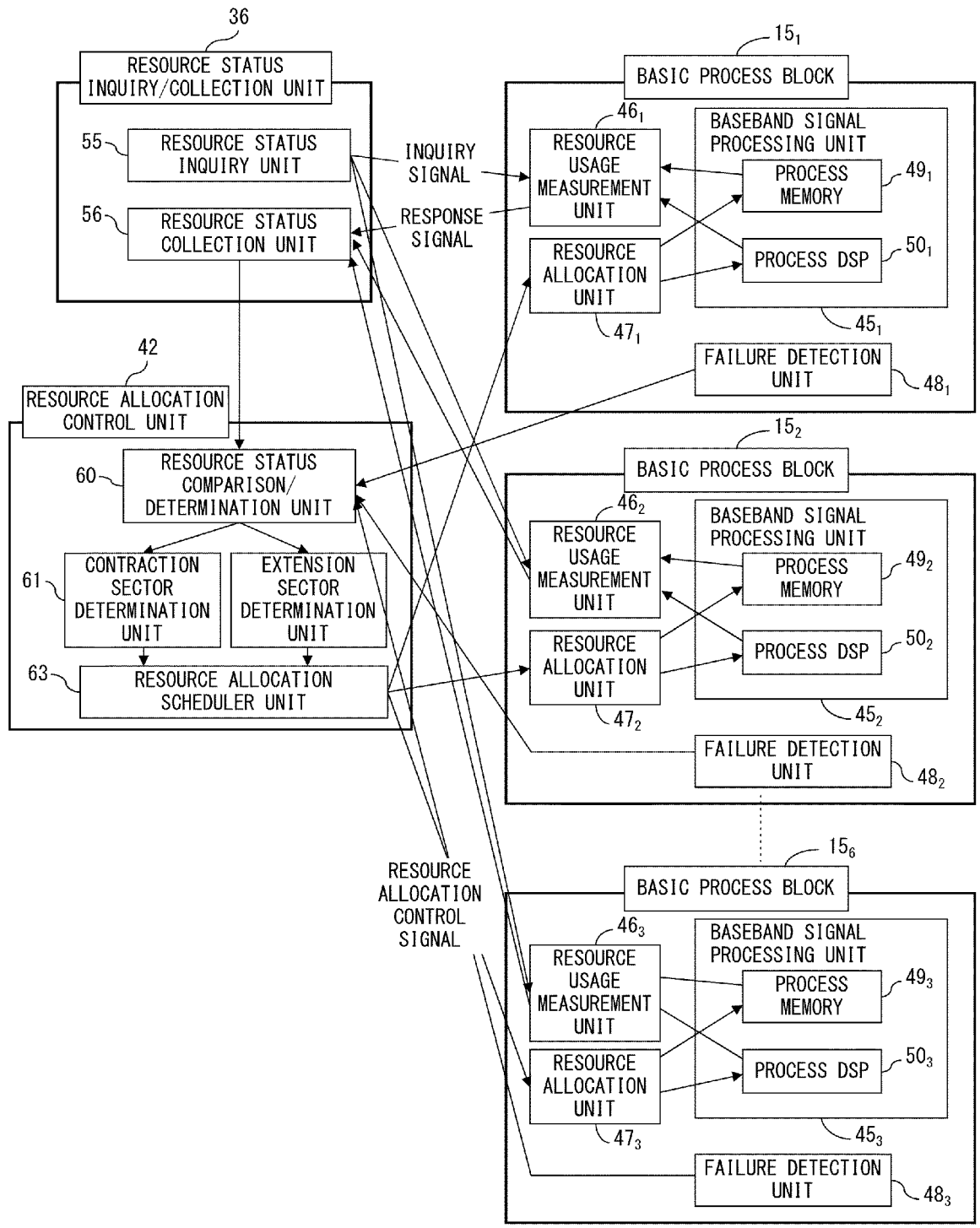
F I G. 1 2

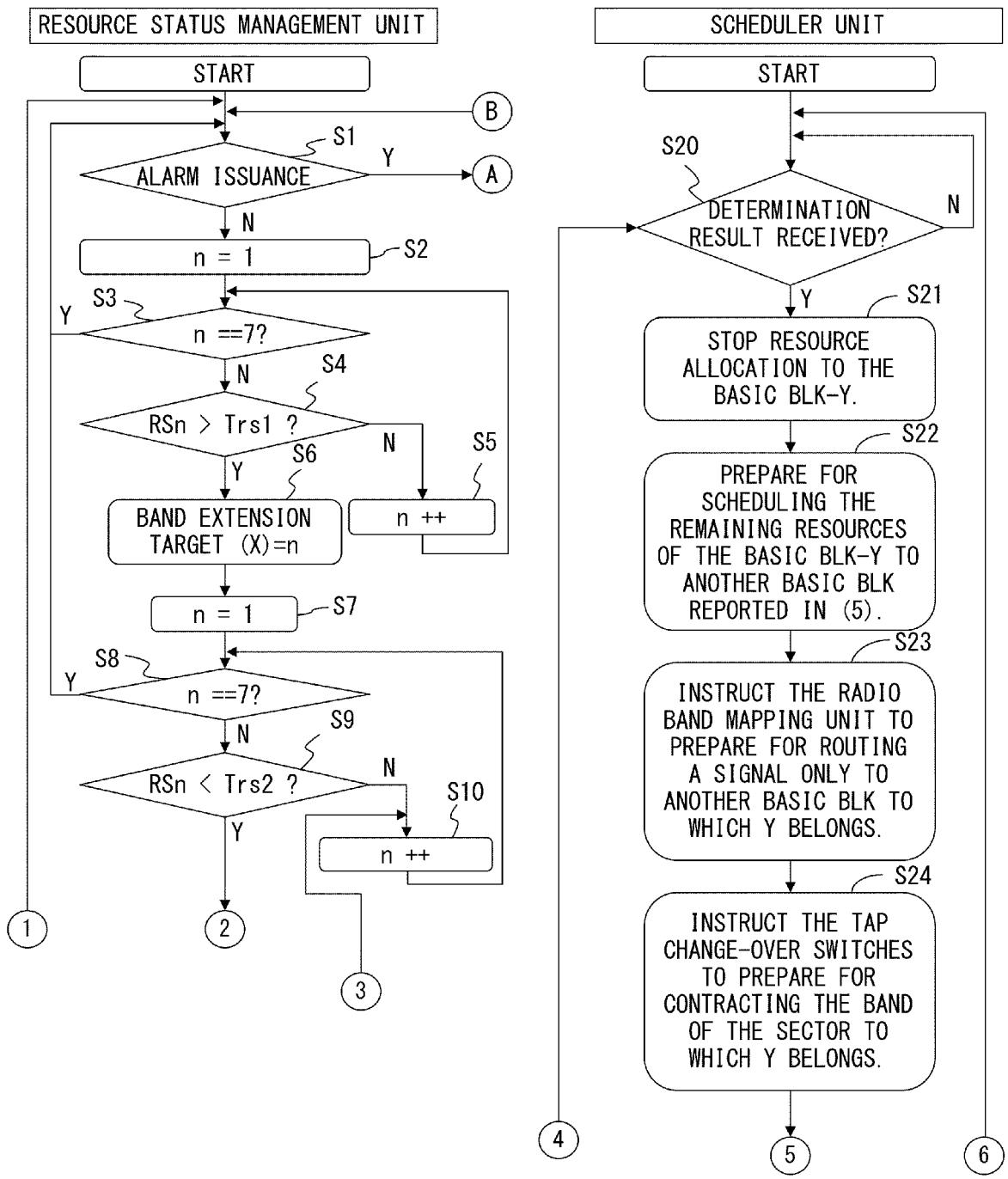
F I G. 1 3 A

RADIO BASE STATION DEVICE AND RADIO RESOURCE CONNECTION SWITCHING METHOD

CROSS-REFERENCE TO RELATED APPLICATION

This application is based upon and claims the benefit of priority of the prior International Publication Pamphlet No. WO 2008-149403, filed on Jun. 4, 2007, the entire contents of which are incorporated herein by reference.

FIELD

The present invention relates to a radio communication method.

BACKGROUND

The use of an OFDM (orthogonal frequency-division multiplex) method, an OFDMA (orthogonal frequency-division multiplex access) method or the like as the latest technique of a radio broadband mobile communication method is studied. The OFDM method divides transmitting information using a plurality of sub carriers of different center frequencies, modulates it for each sub carrier and transmits it in parallel. Thus, symbol transfer speed per carrier can be made slower than that in the case of serial transfer by dividing information and the influence of fading can be reduced.

The OFDMA method realizes multi-access by dividing the sub carriers of the OFDM method into several groups, extracting sub carriers from each group and using each of the extracted sub carriers as a group of sub carriers for each user. Thus, the high use efficiency of frequency can be obtained compared with a conventional FDMA method.

FIG. 1 is a configuration block diagram of a conventional example of a radio base station device using, for example, such an OFDM method. This radio base station device divides a radio communication area, that is, an area where terminals accommodated in one base station into a plurality of sectors and conducts radio communications with its terminals.

In FIG. 1, a radio base station device 100 can accommodate a frequency band of 10 MHz for each of three sectors and includes three process units of a sector 1 process unit $101_1$ through a sector 3 process unit $101_3$ for each of the sectors. Each process unit, for example, the sector 1 process unit $101_1$. includes two basic process blocks, such as basic process blocks $102_1$ and $102_2$ of 5 MHz per carrier. In a down process, that is, at the time of transmitting to the terminal side, this basic process block performs a baseband process, such as encoding user data from an entrance line connected to an exchange or the like and outputs its result to, for example, inverse fast Fourier transfer (IFFT) process unit. In up process, that is, at the time of receiving from the terminal side, this basic process block performs a baseband process, such as decoding data from an FFT (fast Fourier transfer) process unit or the like and outputs its result to the entrance line side.

FIG. 2 explains the problem of the conventional device illustrated in FIG. 1. In FIG. 2, many user terminals are concentrated to the sector 2 area and few user terminals exist in the sector 1 and 3 areas. As explained in FIG. 1, inside the radio base station device 100, two basic process blocks are fixedly allocated to each sector process unit. Therefore, even when the amount of hardware resources of the entire base station device is sufficient, the amount of radio hardware resources becomes insufficient for the sector 2 and there is a possibility that a non-connectable call or an incomplete call in which a call is disconnected while not completed occurs.

As a conventional art for improving the frequency use efficiency of such a radio base station device, Japanese Laid-open Patent Publication No. 2005-27189 "Control Station, Radio Communication System and Frequency Allocation Method" discloses a technique for improving the frequency band use efficiency of the entire system by regularly modifying frequency (channel) allocation in such a way as to maintain an interference level constant, without fixedly allocating a frequency to each cell in an FDMA system.

However, for example, in an OFDMA system, that is, a radio communication system capable of changing frequency bandwidth, which is the subject of the present application, the technique of this patent document is unsuitable for application.

SUMMARY

A radio base station device handling a plurality of sectors includes a resource allocation amount determination unit to determine amount allocated to each of the plurality of sectors from an amount of radio resources in the radio base station and a resource connection switching unit to switch connection states of a plurality of radio resources obtained by dividing the entire radio resources allocatable to each sector in the base station, according to the determined amount of allocation of radio resources to each sector.

A radio resource connection switching method of a radio base station device handling a plurality of sectors includes determining an amount allocated to each of the plurality of sectors from an amount of radio resources in the radio base station and switching connection states of a plurality of radio resources obtained by dividing the entire radio resources allocatable to each sector in the base station, according to the determined amount of allocation of radio resources to each sector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is the configuration block diagram of a conventional radio base station device.

FIG. 2 explains the problem of the conventional device illustrated in FIG. 1.

FIG. 3 is the principle configuration block diagram of a radio base station device in this embodiment.

FIG. 5 explains an allocatable frequency range according to bandwidth.

FIG. 8 is the configuration block diagram of the entire radio base station device.

FIG. 12 is the detailed configuration block diagram of a basic process block, a resource status inquiry/collection unit and a resource allocation control unit.

FIGS. 13A and 13B are the detailed sequence of a resource status management operation (No. 1).

DESCRIPTION OF EMBODIMENTS

FIG. 3 is the principle configuration block diagram of a radio base station device in this embodiment. In FIG. 3, the radio base station device 1 includes a resource allocation amount determination unit 2 and a resource connection switching unit 3 and handles a plurality of sectors in a radio communication system using, for example, an OFDMA method. Although the OFDMA method features an access method, it uses OFDM as a modulation method. Therefore, conceptually it is included in the OFDM method.

The resource allocation amount determination unit 2 determines the amount allocated to each of the plurality of sectors from the amount of radio resources in a base station. This amount allocated to each sector from the amount of radio resources is determined, for example, by the number of basic process blocks corresponding to frequency bandwidth available in each sector. The resource allocation amount determination unit 2 corresponds to, for example, a scheduler unit, which will be described later.

The resource connection switching unit 3 switches the connection status in the base station of a plurality of radio resources obtained by dividing the entire radio resources in the base station, according to the amount allocated to each sector from the radio resources, determined by the resource allocation amount determination unit 2. It is a tap change-over switch for switching over the connection, for example, between a plurality of basic process blocks, an inverse fast Fourier transfer (IFFT) process unit corresponding to each sector and a fast Fourier transfer (FFT) process unit.

In this embodiment, as will be described later, the amount of radio resources, such as the basic process block can be efficiently used, for example, according to the distribution status of user terminals in each sector, for example, by giving user data inputted from the exchange side via an entrance line to a basic process block connected to an RF process unit on the sector side where the data is transmitted by a radio band mapping unit or the like.

Figure 4:
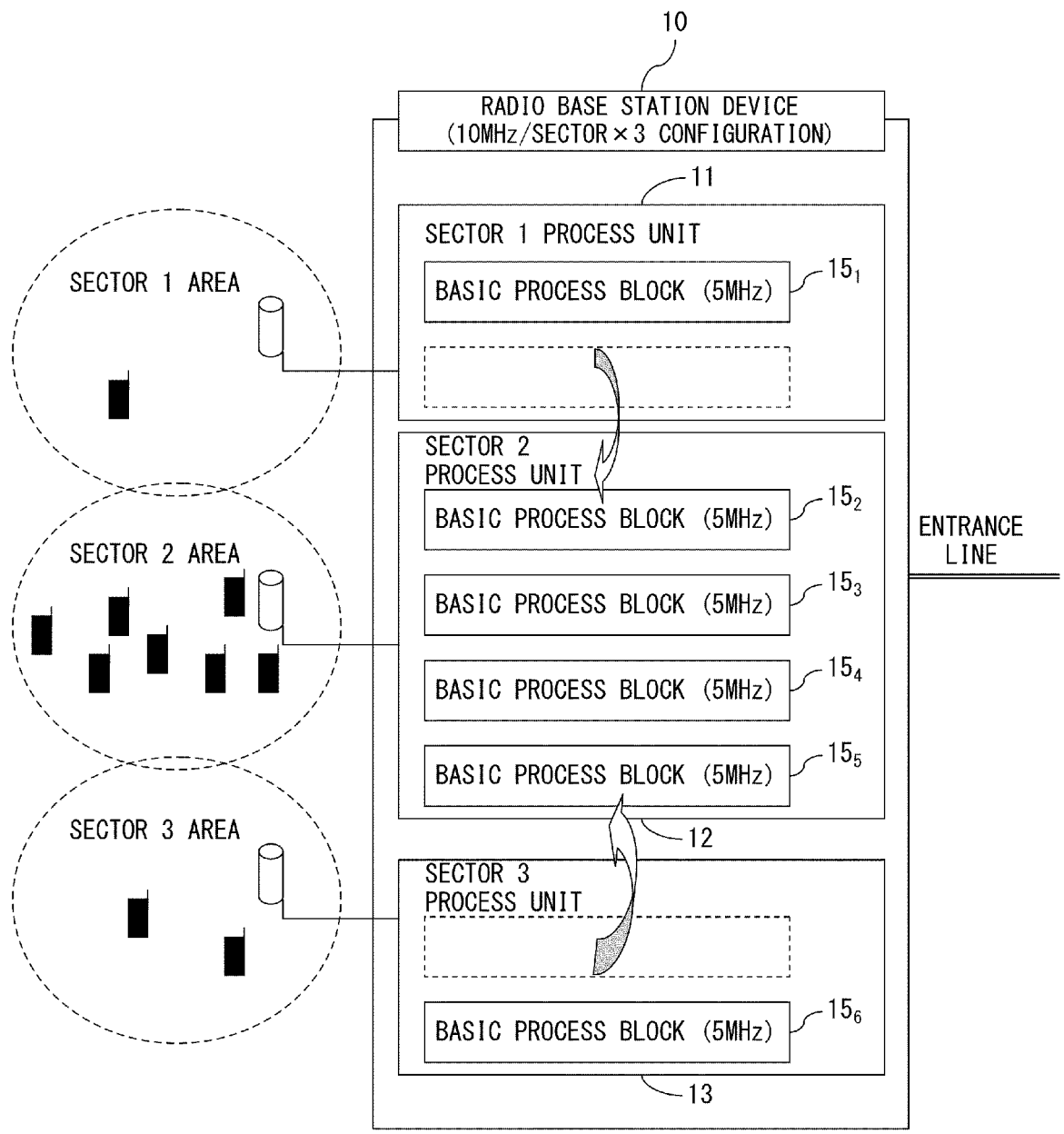
FIG. 4 is the basic configuration block diagram of a radio base station device in this embodiment.

FIG. 4 is the basic configuration block diagram of the radio base station device in this embodiment. In FIG. 4, although each of sector process units 11 through 13 corresponding to three sectors includes one or more basic process block, the number of the basic process block inside each of the sector 1 process unit 11 and the sector 3 process unit 13 is one while four basic process blocks are allocated to the sector 2 process unit 12. Frequency band width corresponding to the sector 2 is extended to 20 MHz compared with the conventional device illustrated in FIG. 1 while frequency bandwidth corresponding to each of the sectors 1 and 3 is contracted to 5 MHz.

In sector 1 and 3 areas, since the number of user terminals is small, the demand of users can be satisfied by service using a 5 MHz band while in the sector 2, necessary radio resources can be secured by extending its bandwidth to 20 MHz in accordance with the increase of user terminals, thereby avoiding the occurrence of an incomplete call and the like.

FIG. 5 explains an allocatable frequency range according to each bandwidth in this embodiment. In this embodiment it is assumed that effective used bandwidth is changed for each user channel by restricting the allocation range of radio resources (frequency range) according to bandwidth. When the maximum bandwidth is 20 MHz, 20 MHz is divided in units of 5 MHz and the mapping range of usable frequencies is defined in each of four steps of bandwidth, that is, bandwidth of 5/10/15/20 MHz. Namely, FIG. 5 illustrates an allocatable frequency range in each bandwidth around a center frequency. For example, in 10 MHz bandwidth, twice the frequency range in 5 MHz bandwidth can be allocated.

Figure 6:
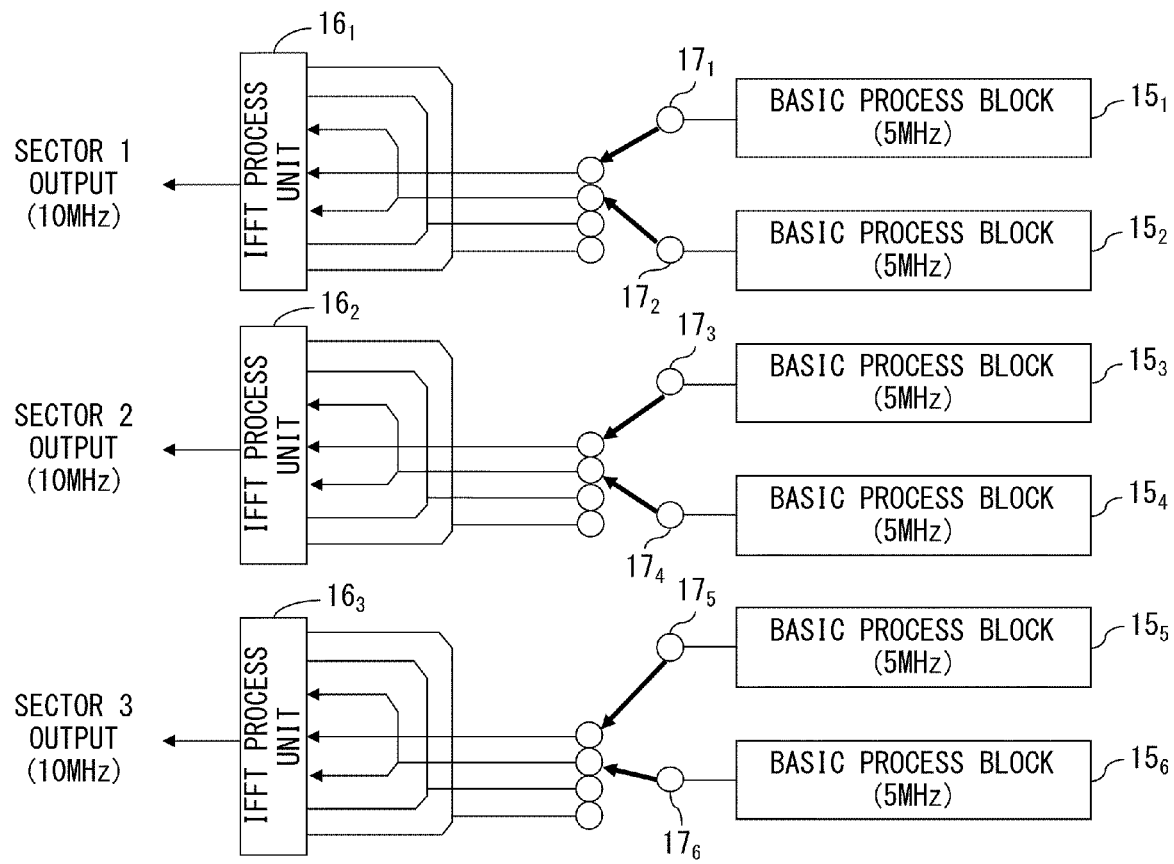
FIG. 6 is the basic configuration block diagram of a down OFDM process function.
Figure 7:
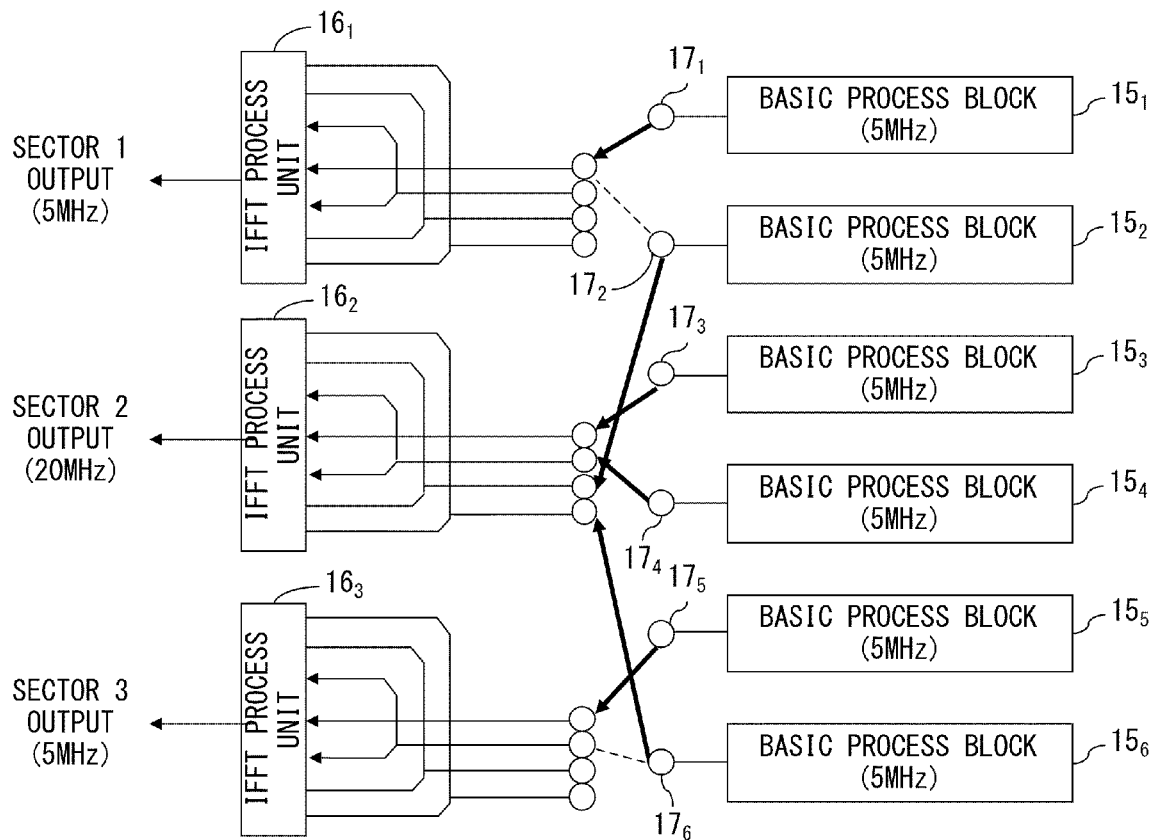
FIG. 7 is the basic configuration block diagram of a down OFDM process function (at the time of connection switching).

FIGS. 6 and 7 are the configuration block diagrams of a down OFDM process function. In FIG. 6, as in the case of the conventional device illustrated in FIG. 1, two basic process blocks are allocated to each sector and are connected via an IFFT process unit 16 and a connection tap 17 corresponding to each sector. For example, two basic process blocks $15_1$ and $15_2$ are connected by an IFFT process unit $16_1$ and connection taps $17_1$ and $17_2$ corresponding to the sector 1. Each basic process block can be connected to an arbitrary IFFT process unit via such a connection tap.

FIG. 7 is the configuration block diagram of a down OFDM process function in the case where the frequency bandwidth of each of the sectors 1 and 3 is 5 MHz and the frequency bandwidth of the sector 2 is 20 MHz. In this case, by switching connection of the connection tap 17 the frequency bandwidth of each of the sectors 1 and 3 is contracted to 5 MHz and the frequency bandwidth of the sector 2 is extended to 20 MHz.

FIG. 8 is the configuration block diagram of the entire radio base station device. In FIG. 8, the base station device includes a resource status management unit 20, a scheduler unit 21, a radio band mapping unit 22, RF (radio frequency) process units $23_1$ through $23_3$ for each sector, FFT process units $24_1$ through $24_3$ for each sector, a down tap change-over switch 25, a up tap change-over switch 26, and a frame timing generation unit 27, in addition to the six basic process blocks $15_1$ through $15_6$ and the IFFT process units $16_1$ through $16_3$ for each sector explained in FIG. 6 and FIG. 7.

The frame timing generation unit 27 generates radio frame timing on the basis of a free-running reference signal or a reference signal from an external device, such as a higher-order device including an exchange. The generated timing is distributed and supplied to each block in the base station device and is used to control the timing of the entire device.

As a down process, each of the basic process block $15_1$ through $15_6$ performs a baseband process, such as encoding segmented user data transmitted from the radio band mapping unit 22 according to timing specified by the scheduler unit 21 or the like and outputs it to the down tap change-over switch 25.

As an up process, each of the basic process block $15_1$ through $15_6$ performs a baseband process, such as decoding segmented user data transmitted from the up tap change-over switch 26 according to timing specified by the scheduler unit 21 or the like and the processed data is outputted to the radio band mapping unit 22. The operation of the radio band mapping unit 22 will be described later.

The resource status management unit 20 manages and controls the state of radio resources used in each sector, and also receives and releases a call, according to an instruction from, for example, a higher-order device including an exchange and so on.

The scheduler unit 21 determines for each user which resource block, specifically frequency or time slot, is used to transmit/receive user data and the timing of process execution is supplied from the frame timing generation unit 27.

Figure 9:
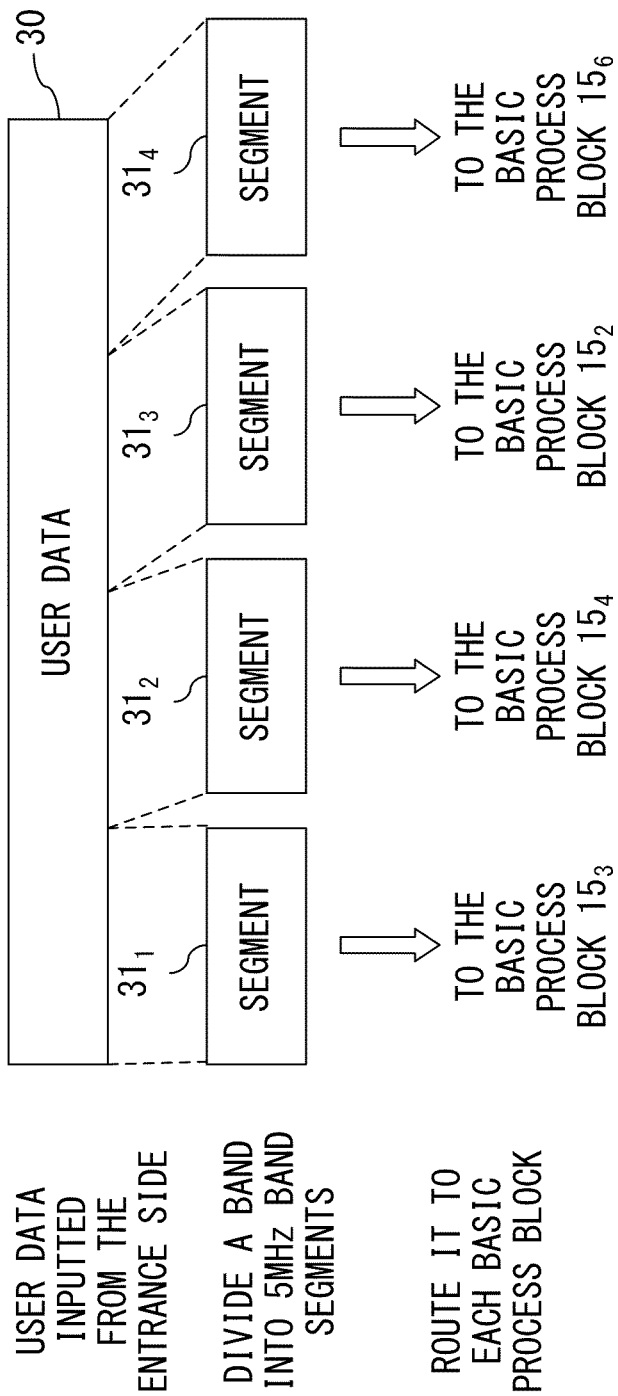
FIG. 9 explains down radio band mapping.
Figure 10:
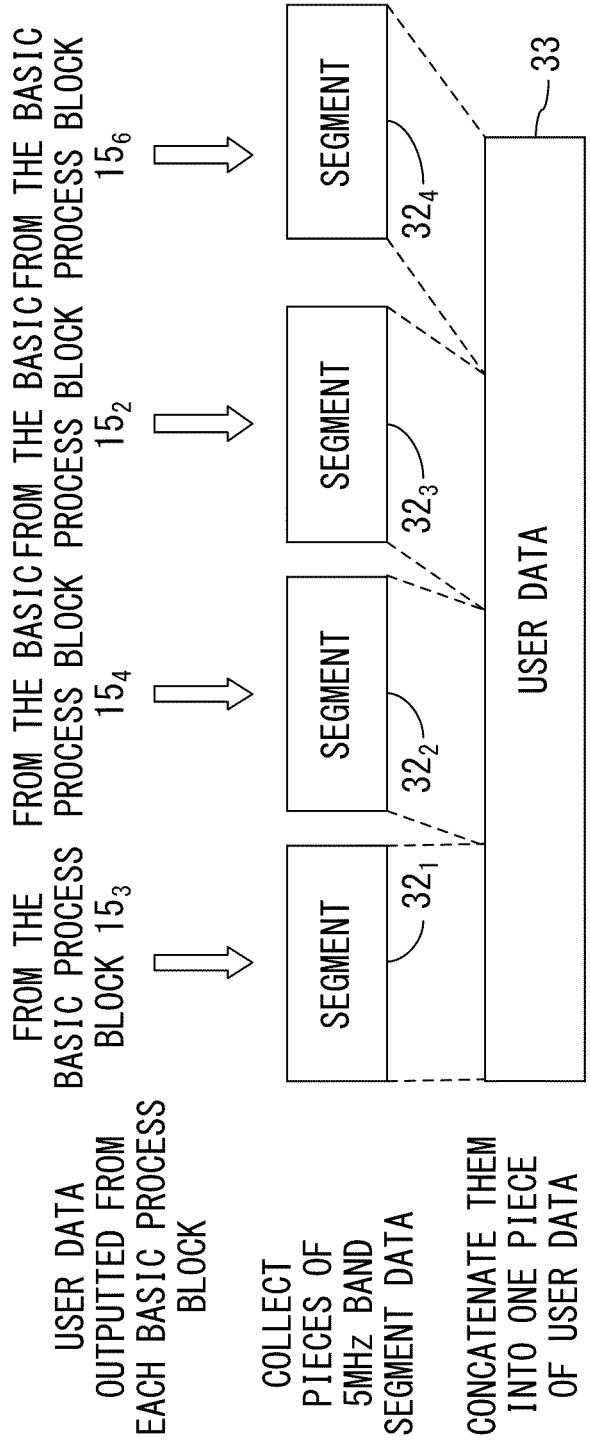
FIG. 10 explains up radio band mapping.

FIGS. 9 and 10 explain the operation of the radio band mapping unit 22.

FIG. 9 explains the down radio band mapping process. In this process, data 30 from a certain user is segmented into four 5 MHz band segments $31_1$ through $31_4$ in order to map on a 20 MHz band and, for example, if related to FIG. 7, they are routed to the basic process blocks $15_3$, $15_4$, $15_2$ and $15_6$, respectively.

FIG. 10 explains the up radio band mapping process. In this process, conversely as in FIG. 9, user data, that is, data $32_1$ through $32_4$ segmented per 5 MHz band, outputted from each of the basic process blocks $15_3$, $15_4$, $15_2$ and $15_6$ are connected, that is, concatenated and outputted to the entrance line side as user data 33. Such an operation of the radio band mapping unit 22 is performed according to an instruction from the scheduler unit 21, that is, by a resource allocation control signal.

Figure 11:
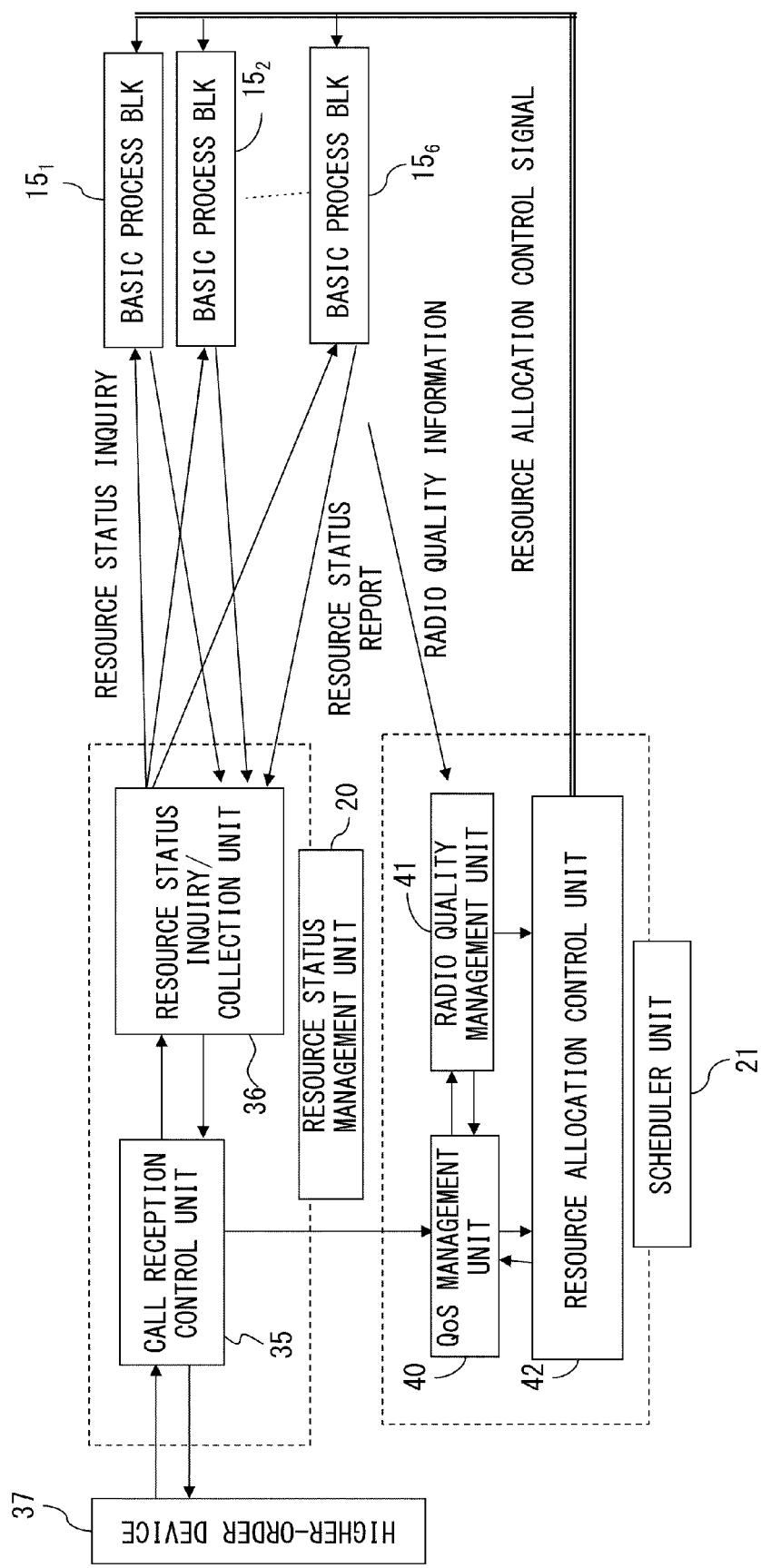
FIG. 11 is the configuration block diagram of a resource status management unit and a scheduler unit.

The configuration and operation sequence of the radio base station device in this embodiment, whose configuration is illustrated in FIG. 8 will be explained in more detail below with reference to FIGS. 11 through 14B. FIG. 11 is the detailed configuration block diagram of the resource status management unit 20 and the scheduler unit 21 illustrated in FIG. 8. In FIG. 11, the resource status management unit 20 includes a call reception control unit 35 and a resource status inquiry/collection unit 36.

The call reception control unit 35 is connected to a higher-order device 37 and controls a reception/release of a call and the like. The resource status inquiry/collection unit 36 is connected to each basic process block, six basic process blocks $15_1$ through $15_6$ in this embodiment and inquires each basic process block of its resource status and collects a resource status report from each basic process block.

The scheduler 21 includes QoS management unit 40 for managing the entire communication performance including radio quality, a radio quality management unit 41 for receiving radio quality information from each basic process block and managing radio quality and a resource allocation control unit 42 for outputting a resource allocation control signal to each basic process block 15 and the radio band mapping unit 22 illustrated in FIG. 8.

FIG. 12 is the detailed configuration block diagram of the resource status inquiry/collection unit 36 and the resource allocation control unit 42 and the basic process blocks $15_1$ through $15_6$ illustrated in FIG. 11. In FIG. 12, firstly each basic process block, for example, the basic process block $15_1$ includes a baseband signal processing unit $45_1$ for performing a baseband process, a resource usage measurement unit $46_1$ measuring the usage of resources in its own block, a resource allocation unit $47_1$ for receiving a resource allocation control signal from the resource allocation control unit 42 and a failure detection unit $48_1$ for detecting a failure in its own block. The baseband signal processing unit $45_1$ includes process memory $49_1$ and a process digital signal processor (DSP) $50_1$.

The resource status inquiry/collection unit 36 includes a resource status inquiry unit 55 for outputting an inquiry signal to the resource usage measurement unit 46 in each basic process block 15 and inquiring about a resource status and a resource status collection unit 56 for receiving a response signal from the resource usage measurement unit 46 in each block and collecting a resource status.

The resource allocation control unit 42 includes a resource status comparison/determination unit 60, a contraction sector determination unit 61, an extension sector determination unit 62 and a resource allocation scheduler unit 63. In this case, the output, that is, the collection result of a resource state of the resource status collection unit 56 in the resource status inquiry/collection unit 36 is given to the resource status comparison/determination unit 60 in the resource allocation control unit 42 via the call reception control unit 35 and the QoS management unit 40, as illustrated in FIG. 11. However, in FIG. 12, the call reception control unit 35 and the QoS management unit 40 are omitted.

The resource status comparison/determination unit 60 determines whether the amount of resources used in each of the basic process blocks $15_1$ through $15_6$ exceeds a first threshold value or less than a second threshold value. When, for example, 90% and 40% of the 5 MHz bandwidth of each basic process block are set as the first and second threshold value, respectively, as explained in FIGS. 1 and 4, it is determined whether the used band as the usage of resources exceeds 4.5 MHz or less than 2 MHz. In this case, a failure detection result from the failure detection unit 48 in each basic process block is also given to the resource status comparison/determination unit 60, and both the determination result of the usage of resources and failure information are outputted from the resource status comparison/determination unit 60.

Namely, both the determination result of the usage of resources and failure information of each basic process block are given to the contraction sector determination unit 61 and the extension sector determination unit 62, and the determination results of the contraction sector for reducing the number of basic process blocks to be allocated and the extension sector for increasing the number of basic process blocks to be allocated are given to the resource allocation scheduler unit 63, as described in FIG. 4.

Although generally the resource allocation scheduler unit 63 adaptively schedules a modulation method, transmission signal length and the like, using the output of the QoS management unit 40 and the radio quality management unit 41 as illustrated in FIG. 11, in this embodiment, the resource allocation scheduler unit 63 has a feature that adaptively schedules bandwidth usable at a sector level, also using the determination results of the contraction sector determination unit 61 and the extension sector determination unit 62 and can efficiently run the system.

Figure 13B:
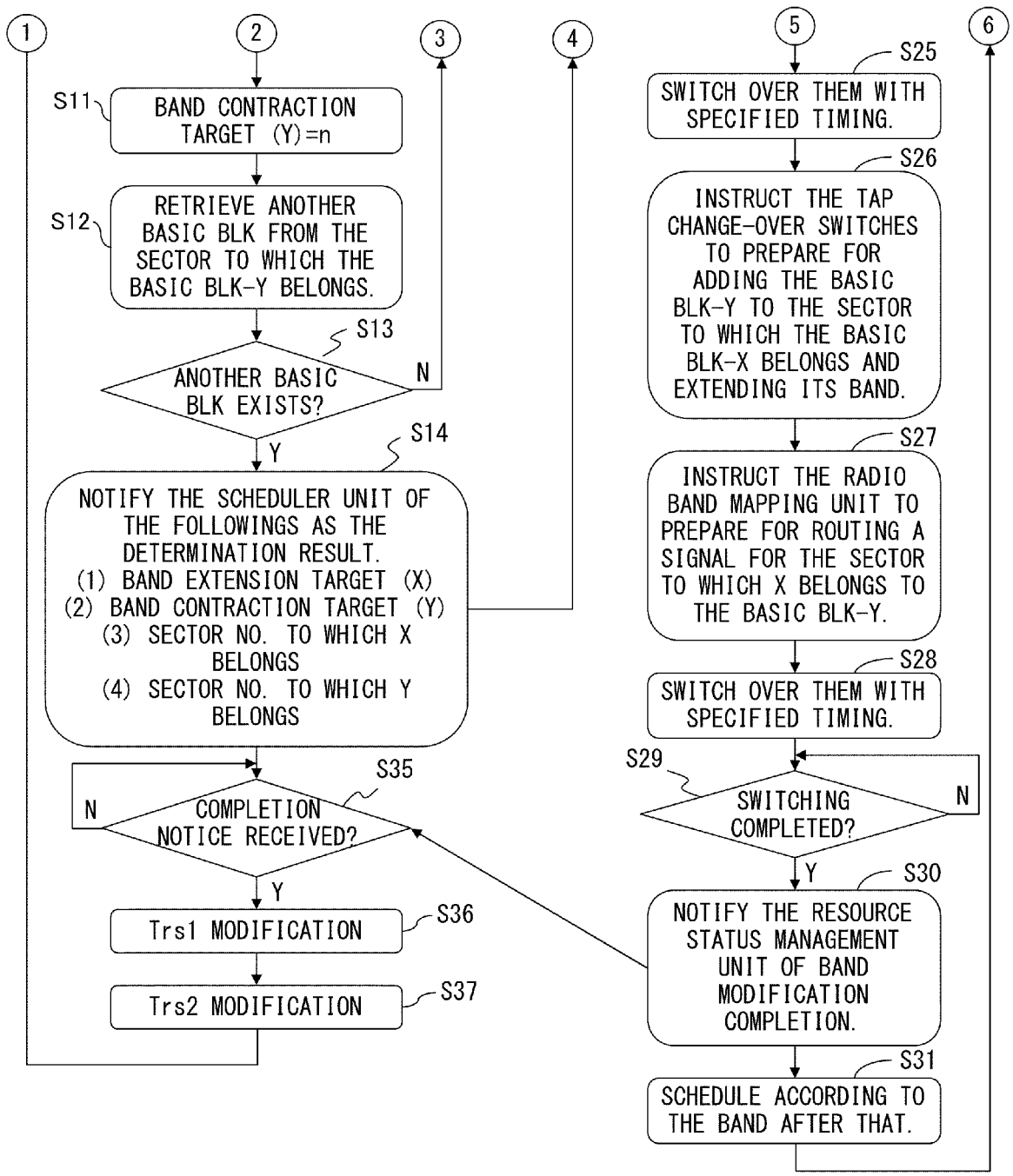
Figure 14A:
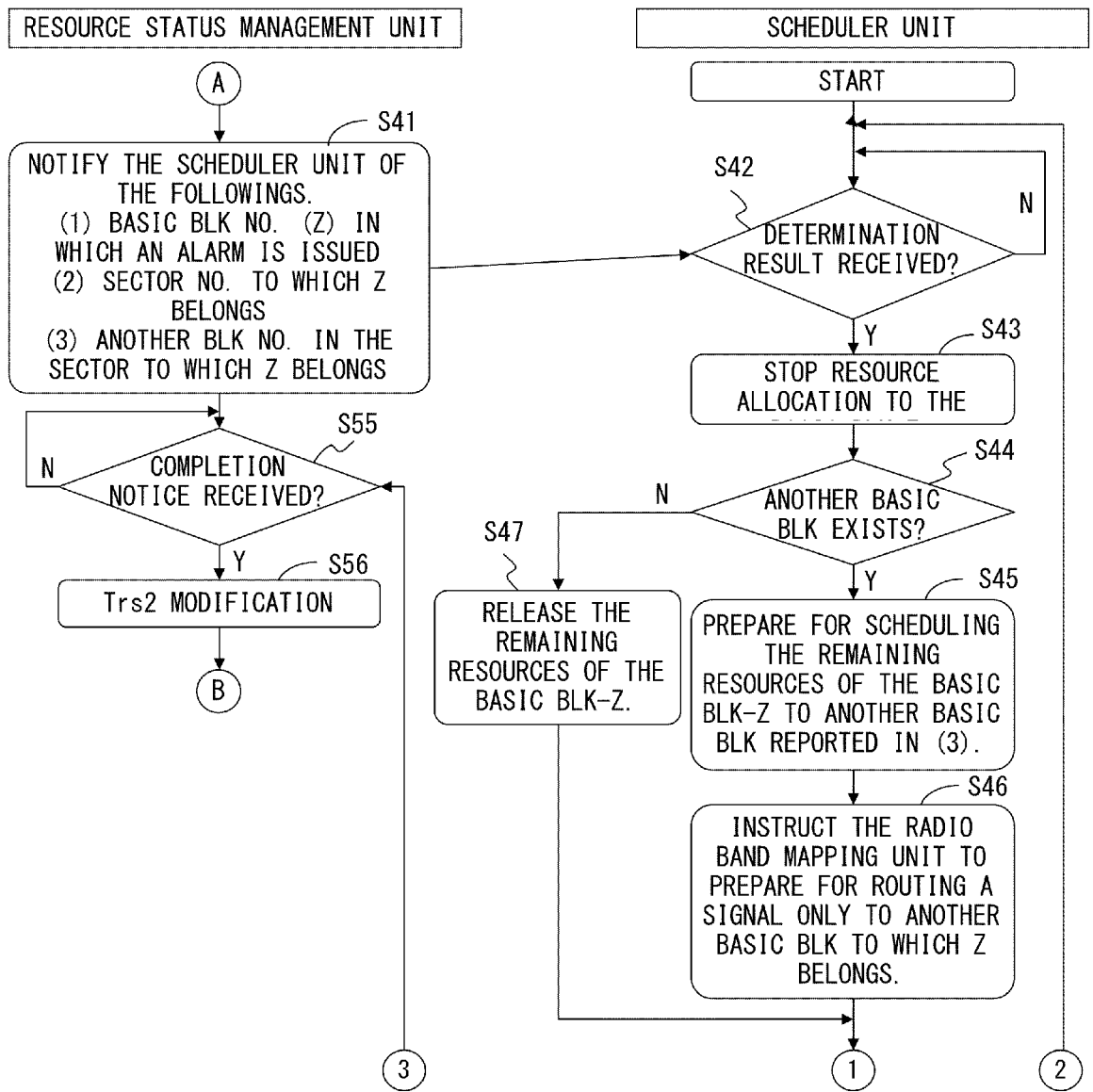
FIGS. 14A and 14B are the detailed sequence of a resource status management operation (No. 2).
Figure 14B:
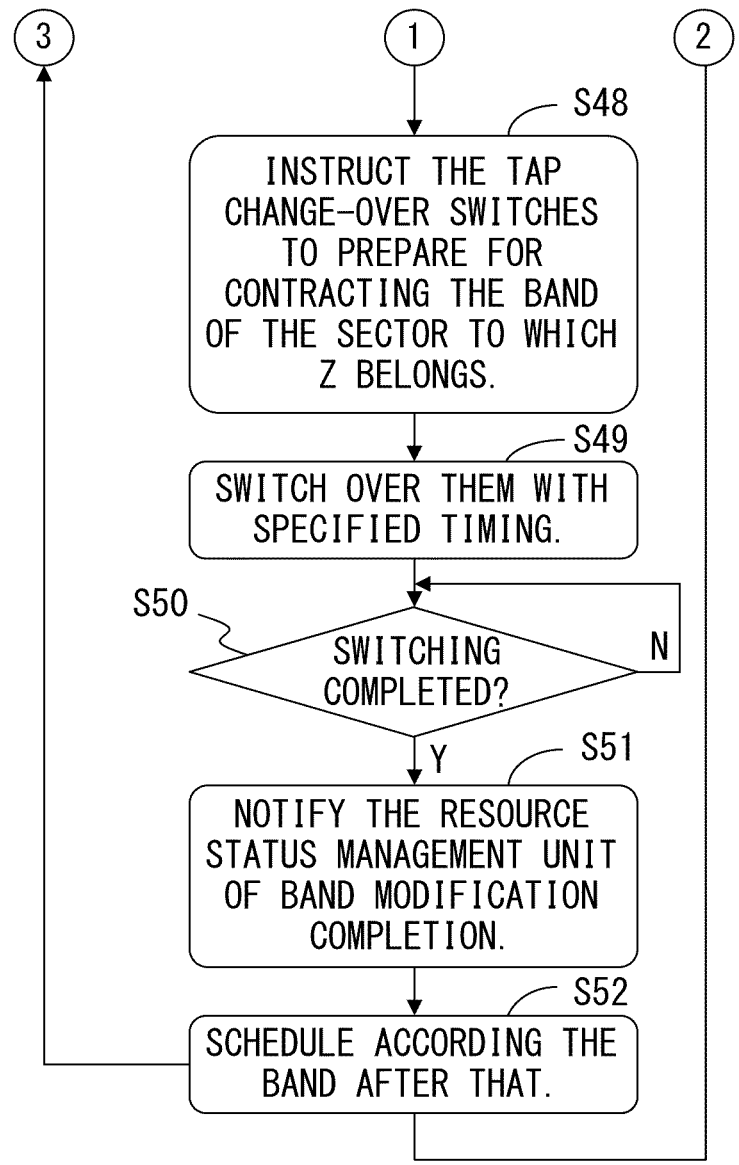

FIGS. 13A, 13B, 14A and 14B are the detailed sequence of the operation performed in the radio base station device illustrated in FIG. 8. FIGS. 13A and 13B are the sequence of its basic operation performed when no failure detection is reported from any of the failure detection units corresponding to each basic process block illustrated in FIG. 12. FIGS. 14A and 14B are the sequence of its additional operation performed when a failure is detected. The operation sequence indicates the operation of a radio resource management process in this embodiment, which is basically performed by the resource status management unit 20 and the scheduler unit 21 which are illustrated in FIG. 8.

When an operation is started on the resource status management unit side in FIG. 13A, firstly in step S1 it is determined whether an alarm is generated, that is, whether an alarm indicating that a failure is detected in any of the basic process blocks is issued. If it is not generated, in step S2 the value corresponding to the number n of the basic process block is initialized to "1" and in step S3 it is determined whether the value of n is "7". In this case, the number of basic process blocks is six, as illustrated in FIG. 8, and the fact that the value of n is "7" means that the processes of all the basic process blocks have been completed.

It is not determined that the value of n is "7", in step S4 it is determined whether the usage of resources RSn of the n-th basic process block exceeds the first threshold value Trs1, for example, 90%. If it does not exceed the first threshold value Trs1, in step S5 the value of n is incremented and the processes in steps S3 and after are repeated. Note that if it is determined that the value of n is "7" in step S3, it is determined that there is no block in the six basic process blocks in which the usage of resources exceeds the first threshold value, and then the processes in step S1 and after are repeated.

If in step S4 it is determined that the usage of resources RSn of the n-th basic process block exceeds the first threshold value, in step S6, the number X of a basic process block whose band is targeted to be extended is made n, and then in step S7 the value of n is initialized to "1" again.

Steps S8 through S13 regard detection of a basic process block whose usage of resources is less than the second threshold value. In step S8 it is determined whether the value of n is "7". If they are not matched, in step S9 it is determined whether the usage of resources of the n-th basic process block is less than the second threshold value Trs2. If it is not less than the second threshold value Trs2, in step S10 the value of n is incremented and the processes in step S8 and after are repeated. If in step S8 it is determined that the value of n reaches "7", it means that no basic process block whose usage of resources is less than the second threshold value exists and the processes in step S1 and after are repeated.

If in step S9 it is determined that a basic process block whose usage of resources is less than the second threshold value exists, in step S11 the basic process block whose number is n is specified to be a basic process block Y whose band is targeted to contract, in step S12 other basic process blocks allocated corresponding to a sector to which the basic process block (BLK) Y belongs are retrieved and in step S13 it is determined whether such a basic process block exists. If no such basic process block exists, since the basic process block Y cannot be allocated to another sector for band contraction, the processes in step S10 and after are repeated.

If in step S13 it is determined that such a basic process block exists, in step S14 its determination result is reported to the scheduler unit. The contents of this notice include the number X of a basic process block whose band is targeted to extend (1), the number Y of a basic process block Y whose band is targeted to contract (2), the number of a sector to which X belongs (3), the number of a sector to which Y belongs (4) and the number of another basic process block allocated to a sector to which Y belongs (5).

When an operation is started on the scheduler unit side, in step S20 it is always monitored whether a determination result is received from the resource status management unit. If in step S20 it is determined that the determination result has been received, in step S21 the resource allocation to the basic process block Y after that is stopped and in step S22 the schedule modification of resources that remains in this basic process block to the other basic process block whose number is notified as the notice contents (5) is prepared. In step S23, the radio band mapping unit is instructed to prepare for routing a signal only to this basic process block. In step S24, in order to contract the band of the sector to which the basic process block Y is allocated, the two tap change-over switches 25 and 26 are instructed to prepare for switching. In step S25 the switches 25 and 26 are switched with specified timing.

Then, in step S26 the two tap change-over switches 25 and 26 are instructed to prepare for switching in such a way that the basic process block Y is added to the sector to which the basic process block X is allocated to extend its band and in step S27 the radio band mapping unit is instructed to prepare for routing to the basic process block Y a signal for the sector to which the basic process block X is allocated. In step S28 the tap change-over switches are switched with specified timing. In step S29 it is determined whether the switching is completed and the determination continues until the switching has been completed.

When the two tap change-over switches 25 and 26 are switched, resource block allocation information is reported to a mobile station side in real time using a down accessory line and such switching is also made on the mobile station side in cooperation with the base station side. Therefore, the short disconnection of user data never occurs.

If in step S29 it is determined that the switching is completed, the sector extension and contraction is terminated and the system returns to its normal state. Then, in step S30 the band modification completion is reported to the resource status management unit. In step S31 the normal operation, that is, scheduling according to the band after modification is made and the processes in steps S20 and after are repeated.

On the resource status management side, when a band modification completion notice is received from the scheduler unit in step S35, in steps S36 and S37 the first and second threshold values are modified as necessary, and then the processes in steps S1 and after are repeated. In this modification process of these threshold values, for example, in order to determine whether users are suddenly concentrated on the area of the sector to which only one basic process block is allocated, the first threshold value is modified to, for example, to 80%. However, such a modification of the threshold value is not indispensable and the first and second threshold values can also be left to be 90% and 40% as described above without being modified.

If in step S1 of FIG. 13A, an alarm is issued, that is, a failure is detected in any of the basic process blocks, the process moves to the operation sequence illustrated in FIGS. 14A and 14B. In step S41 of FIG. 14A, the number Z of a basic process block in which a failure is detected (1), the number of a sector to which the block Z is allocated (2) and the number of another basic process block belonging to a sector to which the block Z is allocated (3) are reported from the resource status management unit to the scheduler unit.

On the scheduler unit side, in step S42 it is monitored whether a determination result is received from the resource status management unit. If it is determined that the determination result has been received, in step S43 the resource allocation to the basic process block Z is stopped after that and in step S44 it is determined whether another basic process block exists.

If another basic process block exists in the sector to which the basic process block Z is allocated, in step S45 the schedule modification of the remaining resources of the block Z to the other basic process block whose number is notified as the notice contents (3) is prepared. In step S46, the radio band mapping unit 22 is instructed to prepare for routing a signal only to the other basic process block for the sector, and the process moves to step S48. If in step S44 it is determined that no other block exists, in step S47 the remaining resources of the basic process block Z are released, and then the process moves to step S48.

In step S48 in order to contract the band of the sector to which the basic process block Z is allocated, the two tap change-over switches 25 and 26 are instructed to prepare for switching. In step S49 the switching is made with specified timing and in step S50 it is determined whether the switching is completed. In step S51 the band modification completion is reported to the resource status management unit, and then in step S52 the normal operation, that is, scheduling according to the modified band is made and the processes in steps S42 and after are repeated.

On the resource status management unit side, when a band modification completion notice is received from the scheduler unit in step S55, in step S56 the second threshold value is modified as necessary, and then the process moves to step S1 of FIG. 13A. It is because since a basic process block in which a failure is detected cannot be used, the possibility of the contraction of another basic process block has to be increased. The second threshold value, for example, is modified at this moment such that the second threshold value is increased from 40% to 50%. However, it is not indispensable and it can also be left to be 40%, the same as before.

As described above, according to an embodiment of the present invention, the efficient use of radio resources can be realized by determining the amount of allocation of radio resources to each sector, for example, according to the number of user terminals accommodated in each sector or the like, and to the frequency bandwidth which can be accommodated in each sector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio base station device handling a plurality of sectors, comprising:
a resource allocation amount determination unit to determine amount allocated to each of the plurality of sectors from an amount of radio resources in the radio base station; and
a resource connection switching unit to switch connection states of a plurality of base process blocks for performing a baseband process regarding radio resources obtained by dividing the entire radio resources allocatable to each sector in the base station, according to the determined amount of allocation of radio resources to each sector, wherein
the resource allocation amount determination unit comprises
an extension sector determination unit to determine a sector whose amount of radio resources to be allocated needs to increase from the plurality of sectors; and
a contraction sector determination unit to determine a sector whose amount of radio resources to be allocated is able to be reduced from the plurality of sectors, and
an amount allocated to each of the plurality of sectors is determined according to determination results of the extension sector determination unit and the contraction sector determination unit.

2. The radio base station device according to claim 1, which uses an orthogonal frequency-division multiplex method as its radio modulation method, wherein the amount allocated to each of the sectors from radio resources corresponds to a bandwidth of a frequency usable in the sector.

3. The radio base station device according to claim 1, further comprising
a failure detection unit to detect a failure that occurs in the device, wherein
the resource allocation amount determination unit determines an amount of allocation of resources to each of the plurality of sectors according to a detection result of the failure.

4. A radio resource connection switching method of a radio base station device handling a plurality of sectors comprising:
determining an amount allocated to each of the plurality of sectors from an amount of radio resources in the radio base station; and
switching connection states of a plurality of base process blocks for performing a baseband process regarding radio resources obtained by dividing the entire radio resources allocatable to each sector in the base station, according to the determined amount of allocation of radio resources to each sector, wherein
the determining comprises
determining a sector whose amount of radio resources to be allocated needs to increase from the plurality of sectors; and
determining a sector whose amount of radio resources to be allocated is able to be reduced from the plurality of sectors, and
an amount allocated to each of the plurality of sectors is determined according to determination results of the determining a sector whose amount of radio resources to be allocated needs to increase and the determining a sector whose amount of radio resources to be allocated is able to be reduced.

* * * * *